(12) United States Patent
Udagawa

(10) Patent No.: US 8,054,601 B2
(45) Date of Patent: Nov. 8, 2011

(54) POWER SUPPLY CONTROL APPARATUS HAVING A FUNCTION SUPPLYING POWER SUPPLY VOLTAGE

(75) Inventor: Kazuhiko Udagawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 719 days.

(21) Appl. No.: 12/137,321

(22) Filed: Jun. 11, 2008

(65) Prior Publication Data

US 2008/0304194 A1 Dec. 11, 2008
US 2009/0141417 A2 Jun. 4, 2009

(30) Foreign Application Priority Data

Jun. 11, 2007 (JP) ................. 2007-153991

(51) Int. Cl.
*H02H 3/00* (2006.01)
(52) U.S. Cl. .......................... 361/92; 361/87
(58) Field of Classification Search .......... None
See application file for complete search history.

(56) References Cited

U.S. PATENT DOCUMENTS

| | | | | |
|---|---|---|---|---|
| 4,951,171 A | * | 8/1990 | Tran et al. | 361/90 |
| 5,224,010 A | * | 6/1993 | Tran et al. | 361/90 |
| 5,559,376 A | * | 9/1996 | Tachikawa | 307/86 |
| 7,761,709 B2 | * | 7/2010 | Choi | 713/168 |
| 2007/0055826 A1 | * | 3/2007 | Morton et al. | 711/141 |

FOREIGN PATENT DOCUMENTS

| | | |
|---|---|---|
| JP | 5-215792 | 8/1993 |
| JP | 2004-234540 | 8/2004 |

OTHER PUBLICATIONS

Patent Abstracts of Japan for Japanese Publication No. 05-215792, Publication date Aug. 24, 1993 (1 page).
Patent Abstracts of Japan for Japanese Publication No. 2004-234540, Publication date Aug. 19, 2004 (1 page).

* cited by examiner

*Primary Examiner* — Stephen W Jackson
*Assistant Examiner* — Angela Brooks
(74) *Attorney, Agent, or Firm* — Osha Liang LLP

(57) ABSTRACT

A microprocessor commonly receives at an A/D port the potentials of the power supplies output from a plurality of types of power supplies (a power supply for HDMI, a power supply for LSI, a power supply for an audio driver IC, and a power supply for a tuner). The A/D port receives the potential of the voltage on an output line of the power supply for HDMI that is divided. If that the potential of the divided voltage is lower than a set potential is detected, the output line is interrupted to interrupt power supply voltage supplied to external equipment.

20 Claims, 5 Drawing Sheets

US 8,054,601 B2

POWER SUPPLY CONTROL APPARATUS HAVING A FUNCTION SUPPLYING POWER SUPPLY VOLTAGE

BACKGROUND OF THE INVENTION

1. Field of the Invention

The present invention relates to power supply control apparatuses and particularly to power supply control apparatus having a function supplying power supply voltage to equipment cabled thereto.

2. Description of the Background Art

Generally in audio and video systems a video signal output device (e.g., an optical disc reproduction device) outputting a video signal and a display or a similar video image display device (e.g., a television (TV) receiver) are connected with a cable. If the cable transmits a signal having an inappropriate magnitude in voltage or passes a current having an inappropriate magnitude, the device may fail. Accordingly in such systems such problem must be prevented.

For example Japanese Patent Laying-open No. 2004-234540 describes that a power supply voltage that is supplied to equipment is divided by a resistor and then input to an analog/digital (A/D) port and measured and in accordance with the measurement result a current to be supplied to a load is controlled with an electronic switch (a field effect transistor: FET).

Furthermore, Japanese Patent Laying-open No. 05-215792 indicates a battery voltage detection circuit. When the battery voltage detection circuit detects that a battery's voltage divided by a resistor has a value indicating a level below a preset threshold voltage of an analog port, a light emitting diode is turned on to issue an alarm.

In recent years a High Definition Multimedia Interface (HDMI) specification has been proposed as a specification of an interface for interconnecting video equipment, and products having an interface function in conformity with the HDMI specification are being introduced into the market. The HDMI specification is a digital video interface (DVI) serving as a standard specification for connecting a personal computer and a display together, plus a function based on the DVI for accommodating household electrical appliance.

The HDMI specification, item 4.2.7 defines that any source equipment (equipment outputting a video signal, e.g., an optical disc reproduction device) be capable of supplying a current of at least 55 mA from a power supply pin serving to supply a direct current (DC) power supply voltage of +5 V and that a supply voltage in doing so be maintained in a range of 4.8 V to 5.3 V. Furthermore, the same item defines that if a current of at least 0.5 A flows, overcurrent protection be required.

However, neither Japanese Patent Laying-open No. 2004-234540 nor 05-215792 specifically discloses a method for preventing an overcurrent flowing through a cable for information equipment including video equipment.

SUMMARY OF THE INVENTION

The present invention contemplates a power supply control apparatus capable of preventing external equipment that is connected thereto by a line outputting power supply voltage from receiving an overcurrent.

To achieve the above object the present invention in one aspect provides a power supply control apparatus comprising: a port commonly receiving potentials of power supplies output from a plurality of types of power supplies, respectively; a voltage dividing resistor inputting to the port a potential of a voltage on an output line of a predetermined type of power supply of the plurality of types of power supplies, that is divided; an interruption unit interrupting the output line of the predetermined type of power supply in response to detecting that the potential of the divided voltage received through the port is lower than a set potential; and a connector for externally supplying a voltage of the predetermined type of power supply from the output line.

The set potential is at most the lowest potential of the potentials of the power supplies output from the plurality of types of power supplies and the predetermined type of power supply has a potential higher than the lowest potential. The interruption unit includes: a switching transistor provided on the output line; and a microprocessor interrupting the output line via the switching transistor in response to detecting that the potential of the divided voltage received through the port indicates at most the set level. The interruption unit further includes a plurality of diodes provided between the plurality of types of power supplies and the port.

The plurality of diodes are associated with the plurality of types of power supplies, respectively, and the plurality of diodes are each connected to have a forward direction in a direction from the port toward an associated one of the power supplies.

The power supply control apparatus is mounted in information equipment. The information equipment is connected to data processing equipment by a cable externally inserted into and removed from the connector and supplies voltage to a load included in the data processing equipment from the predetermined type of power supply through the connector and the cable, and outputs data to be processed to the data processing equipment through the cable. The cable is in conformity with a High Definition Multimedia Interface (HDMI) specification.

The data to be processed is video image data. The data processing equipment reproduces the video image data. The interruption unit detects whether the potential of the divided voltage is lower than the set potential for a predetermined period of time after the potential of the divided voltage decreases from the set potential.

The present invention in another aspect provides a power supply control apparatus comprising: a port commonly receiving potentials of power supplies output from a plurality of types of power supplies, respectively; a voltage dividing resistor inputting to the port a potential of a voltage on an output line of a predetermined type of power supply of the plurality of types of power supplies, that is divided; an interruption unit interrupting the output line of the predetermined type of power supply in response to detecting that the potential of the divided voltage received through the port is lower than a set potential; and a connector for externally supplying a voltage of the predetermined type of power supply from the output line. The set potential is at most the lowest potential of the potentials of the power supplies output from the plurality of types of power supplies and the predetermined type of power supply has a potential higher than the lowest potential.

Preferably, the interruption unit includes: a switching transistor provided on the output line; and a microprocessor interrupting the output line via the switching transistor in response to detecting that the potential of the divided voltage received through the port is lower than the set potential.

Preferably, the interruption unit further includes a plurality of diodes provided between the plurality of types of power supplies and the port. The plurality of diodes are associated with the plurality of types of power supplies, respectively.

The plurality of diodes are each connected to have a forward direction in a direction from the port toward an associated one of the power supplies.

Preferably the power supply control apparatus is mounted in information equipment. The information equipment is connected to data processing equipment by a cable externally inserted into and removed from the connector and supplies voltage to a load included in the data processing equipment from the predetermined type of power supply through the connector and the cable, and outputs data to be processed to the data processing equipment through the cable.

Preferably, the cable is in conformity with a High Definition Multimedia Interface (HDMI) specification. The data to be processed is video image data, and the data processing equipment reproduces the video image data.

Preferably, the interruption unit detects whether the potential of the divided voltage is lower than the set potential for a predetermined period of time after the potential of the divided voltage decreases from the set potential.

The present power supply control apparatus can interrupt an output line of a predetermined type of power supply in response to detecting that a divided voltage has a potential lower than a set potential. This can prevent external equipment cabled to the apparatus from receiving an overcurrent.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe the present invention in embodiments. In the figures, identical or like components are identically denoted. Accordingly, they will not be described repeatedly in detail.

Figure 1:
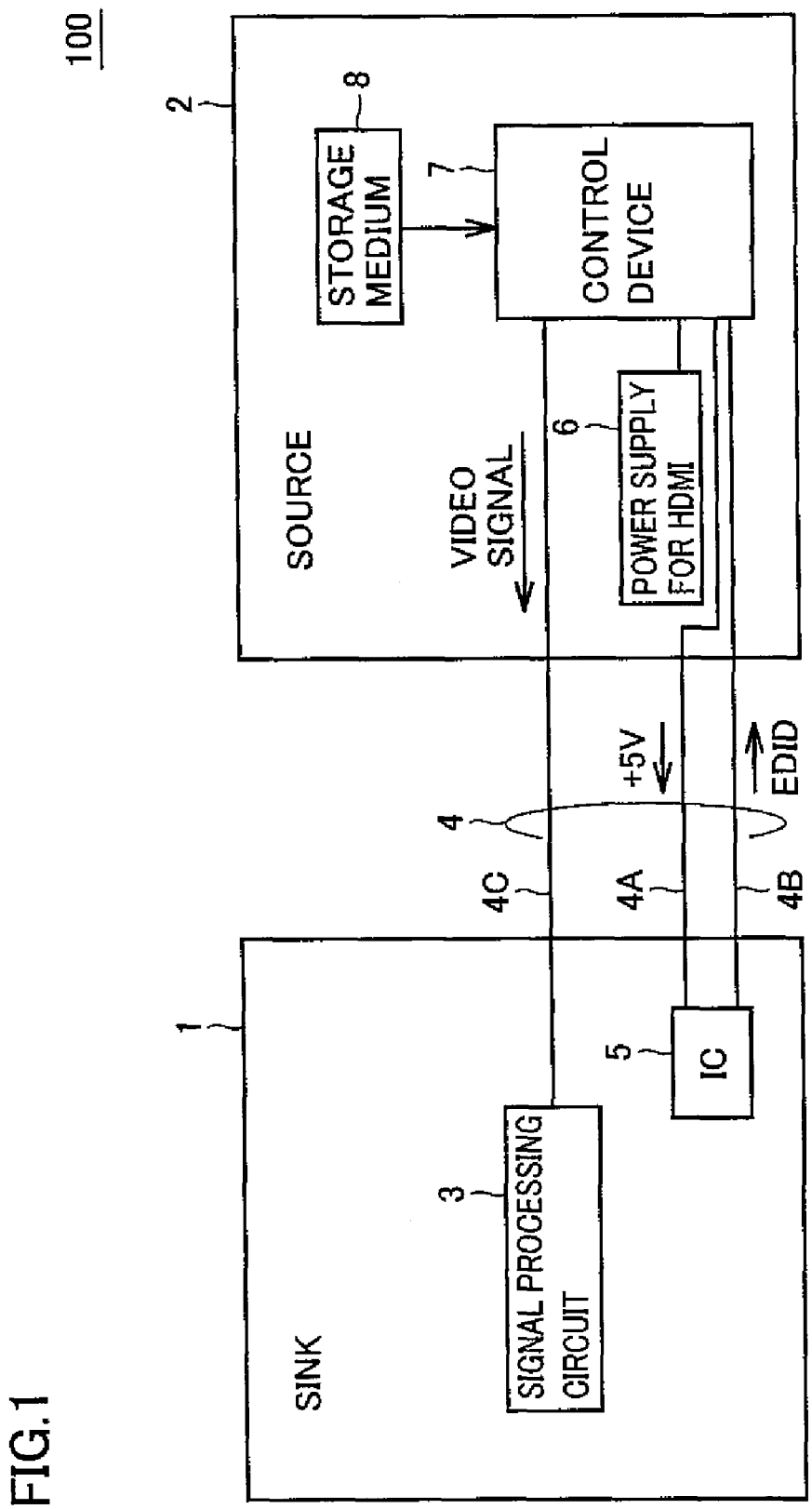
FIG. 1 shows a configuration of a system including information equipment in accordance with an embodiment.

FIG. 1 shows a configuration of a system including information equipment in accordance with the present embodiment.

With reference to FIG. 1, a video system 100 includes sink equipment 1 serving as a video image reproduction circuit, source equipment 2 corresponding to information equipment of the present embodiment, and an HDMI cable 4. "Sink equipment" is equipment receiving a digital video signal. For example it is a TV receiver. "Source equipment" is equipment outputting a digital video signal. For example it is an optical disc reproduction device. A type of optical disc having data reproduced by the optical disc reproduction device is a digital versatile disc (DVD) although it is not limited thereto.

HDMI cable 4 is connected between sink equipment 1 and source equipment 2 to transmit a variety of types of signals (or data). Furthermore HDMI cable 4 is used to supply power supply voltage from source equipment 2 to a load internal to sink equipment 1. HDMI cable 4 is connected to sink equipment 1 and source equipment 2 such that the cable can be inserted into and removed from equipment 1 and 2, as desired.

Sink equipment 1 includes a signal processing circuit 3 and an integrated circuit (IC) 5. Source equipment 2 includes a power supply 6 for HDMI, and a control device 7. HDMI cable 4 includes a power supply line 4A and data lines 4B and 4C.

When sink equipment 1 and source equipment 2 are connected together by HDMI cable 4, power supply 6 for HDMI supplies IC 5 with a DC voltage of a power supply voltage (+5 V) through power supply line 4A. When IC 5 is supplied by power supply 6 for HDMI with power supply voltage, IC 5 transmits extended display identification data (EDID) unique to sink equipment 1 through data line 4B to control device 7. For example, if sink equipment 1 is a TV receiver, the EDID includes information of the TV's resolution.

Control device 7 reads video image data stored in a DVD or a similar storage medium 8 attached thereto, processes the read video image data in accordance with content of the EDID received from sink equipment 1, and outputs on a data line 4C a video signal (a digital video signal) corresponding to the processed video image data. Signal processing circuit 3 receives the video signal transmitted from source equipment 2 through data line 4C, reproduces the received video signal, and displays its video image. Video image data read from storage medium 8 is thus displayed at sink equipment 1 on a screen (not shown), to which a liquid crystal display (LCD), a plasma display panel (PDP) or the like is applied.

Figure 2:
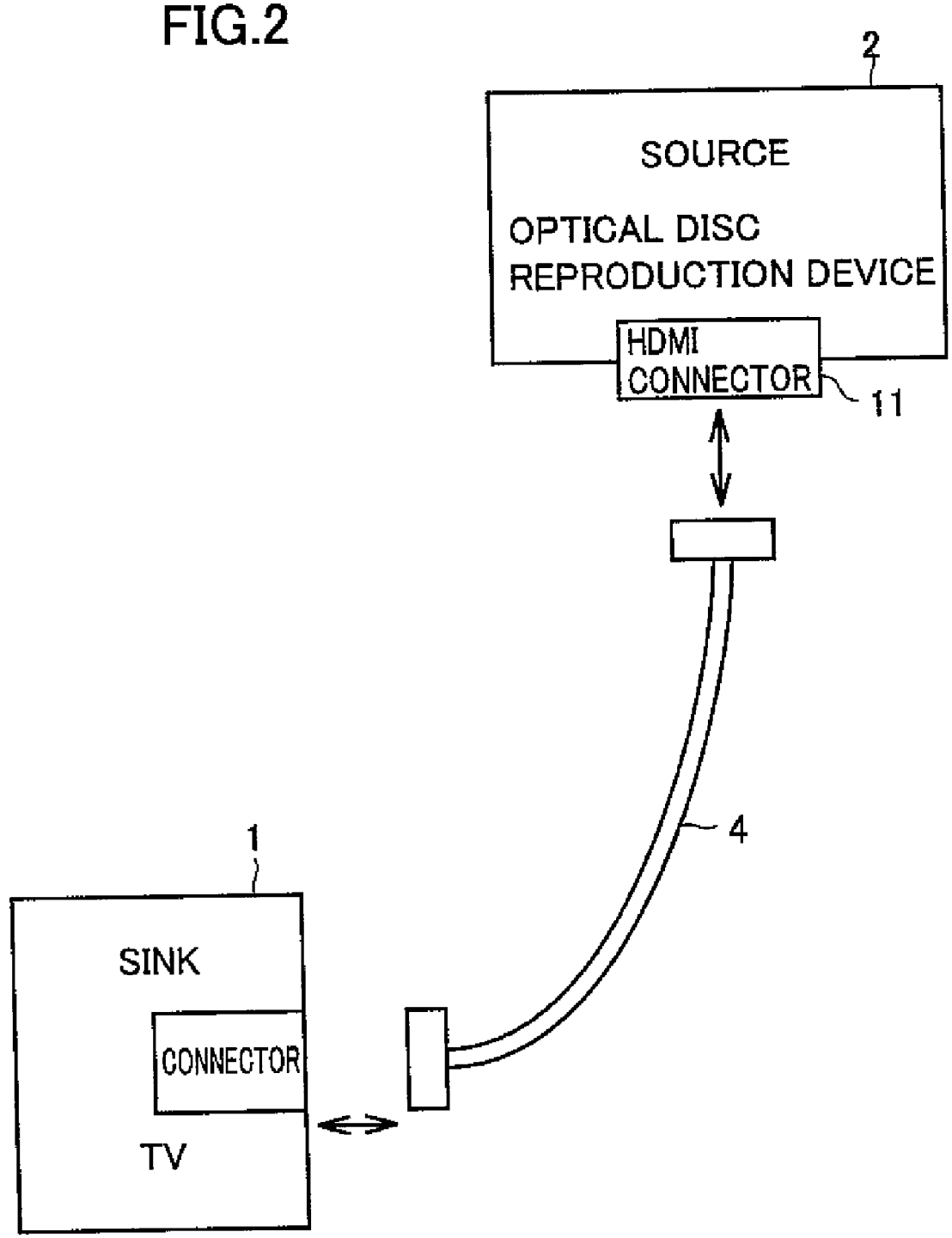
FIG. 2 illustrates a manner of connecting equipment in accordance with an embodiment.

Power supply line 4A connecting source equipment 2 and sink equipment 1 together may pass a current larger than normal. This regard will now be described. FIG. 2 shows sink equipment 1 and source equipment 2 connected/disconnected via HDMI cable 4. If a user desires to cause a video signal output from source equipment 2 to be output (or displayed) at sink equipment 1, the user connects source equipment 2 and sink equipment 1 via HDMI cable 4. HDMI cable 4 has opposite ends with terminals, respectively, connected by the user to an HDMI connector 11 of source equipment 2 and a connector of sink equipment 1 detachably attachably.

HDMI connector 11 is externally exposed. As such, when HDMI cable 4 does not have a terminal connected thereto, HDMI connector 11 may have dust or the like adhering to its exposed surface. The dust adhering to HDMI connector 11 acts as an unexpected resistive component. If such unexpected resistive component exists or there is an abnormal event occurring in a circuit internal to IC 5, e.g., if a value in resistance between a power supply line internal to IC 5 and a ground line decreases, connecting the terminals of HDMI cable 4 to HDMI connector 11 and the connector of sink equipment 1 may cause a current larger than normal to flow through power supply line 4A.

As has been previously described, the HDMI specification, item 4.2.7 defines that if a current of at least 0.5 A flows, overcurrent protection be required. Accordingly in the present embodiment control device 7 has a function to prevent sink equipment 1 from receiving an overcurrent (a current of at least 0.5 A), which function herein indicates an overcurrent protection fuinction.

Control device 7 monitors a voltage on power supply line 4A by detecting a value in voltage that is obtained by dividing the voltage on power supply line 4A by a predetermined ratio. If the divided voltage detected has a value lower than a predetermined value in voltage, i.e., if power supply line 4A passes a current larger than normal, then control device 7 operates to stop (or interrupt) power supply voltage supplied from power supply 6 for HDMI to IC 5. Thus power supply line 4A no longer passes a current. The present embodiment can thus provide information equipment or source equipment 2 implementing an overcurrent protection function as defined in the HDMI specification, item 4.2.7.

Figure 3:
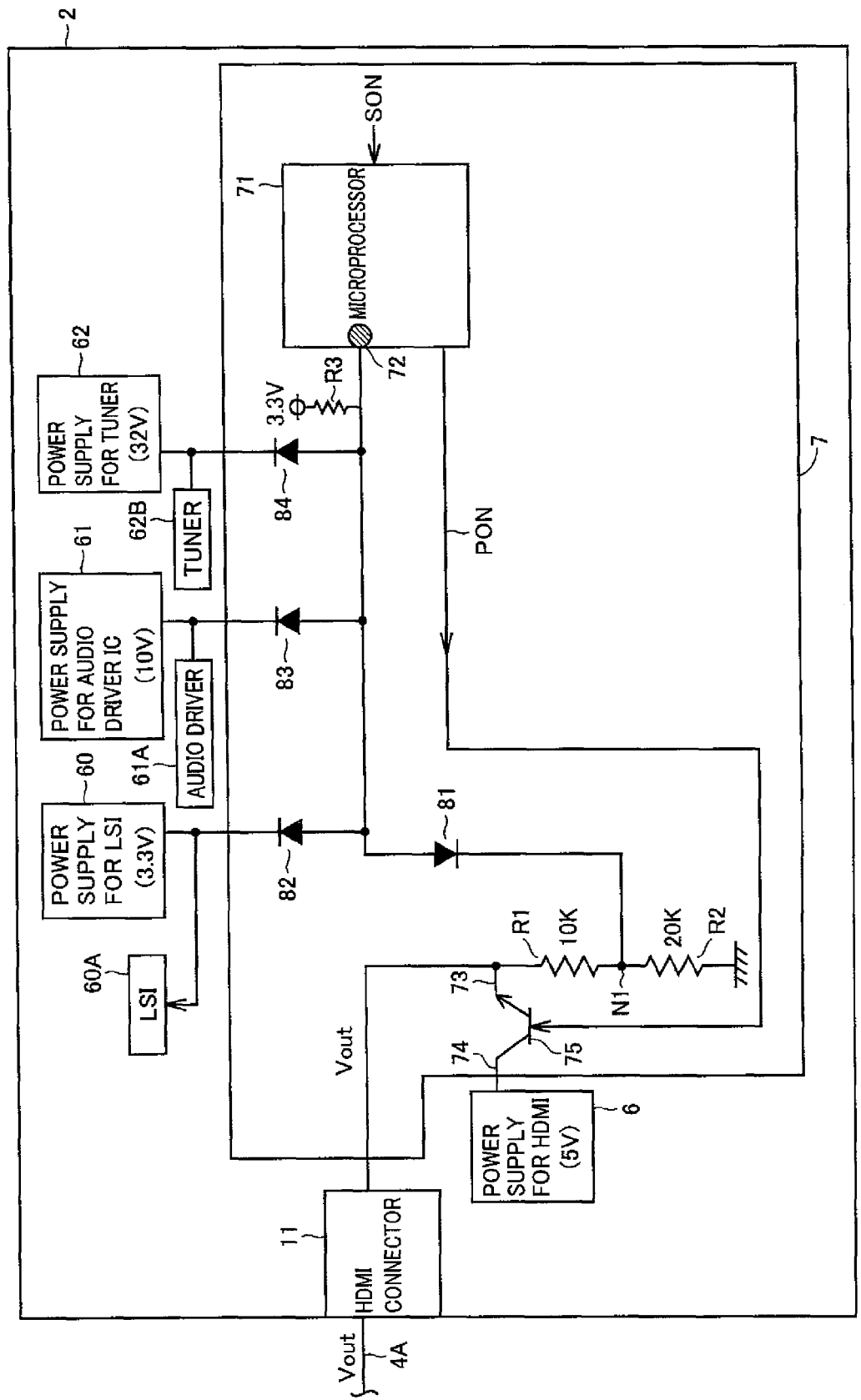
FIG. 3 illustrates a control device and peripheral circuitry in accordance with an embodiment.

FIG. 3 shows a configuration of source equipment 2 including control device 7 and its peripheral circuitry. With reference to FIG. 3, control device 7 includes a microprocessor 71 including an A/D port 72, a transistor 75 connecting together HDMI connector 11 and an output line of power supply 6 for HDMI, diodes 91, 82, 83 and 84, and resistors R1, R2 and R3. Transistor 75 has a collector connected to a line 74 connected to power supply 6 for HDMI, and has an emitter connected to a line 73 connected to an output line closer to HDMI connector 11. Transistor 75 has a base receiving a control signal PON from microprocessor 71. Control signal PON controls transistor 75. When control signal PON has a level of a current of "ON", the power supply voltage of power supply 6 for HDMI is derived through lines 74 and 73 as a voltage signal Vout. When signal PON has a level of a current of "OFF", the power supply voltage of power supply 6 for HDMI is not derived through lines 74 and 73, and voltage signal Vout has a level of zero. Microprocessor 71 has a function interrupting the output line via transistor 75.

Microprocessor 71 receives commonly through A/D port 72 a voltage output from power supply 6 (5 V) for HDMI and obtained at a node N1, and power supply voltages output respectively from a power supply 60 (3.3 V) for supplying power supply voltage to a large scale integrated circuit (LSI) 60A for controlling the operation of sink equipment 2, a power supply 61 (10 V) for an audio driver IC that supplies power supply voltage to an audio driver 61A for outputting reproduced sound, and a power supply 62 (32 V) supplying power supply voltage to a tuner 62B receiving a broadcast signal or the like.

Associated with power supply 6 for HDMI, power supply 60 for the LSI, power supply 61 for the audio driver IC, and power supply 62 for the tuner, diodes 81, 82, 83 and 84 are respectively connected between their respectively associated power supplies and A/D port 72. Diodes 81, 82, 83 and 84 are connected to have a forward direction in a direction from A/D port 72 toward their respectively associated power supplies.

Thus while the power supplies are electrically separated from each other by their respectively associated diodes, the plurality of types of power supplies are connected commonly at a single. A/D port 72, and each power supply potential can be monitored via the single port. In contrast, Japanese Patent Laying-open No. 2004-234540 provides a configuration measuring each power supply voltage at a discrete port independently and thus complicated.

A line connected to A/D port 72 has a pull up resistor R3 connected thereto. Pull up resistor R3 acts to pull up the line's voltage to the lowest one of the plurality of types of power supplies connected to the line, i.e., 3.3 V of power supply 60 for the LSI.

The npn transistor (transistor 75) operates as an element controlling a current supplied to sink equipment 1. Transistor 75 operates in response to control signal PON to switch. If there is a resistive component such as dust adhering to HDMI connector 11, as has been previously described, transistor 75 on line 73 shorts out via the resistive component. In that condition, if it switches to control voltage signal Vout on line 73 to be zero, in reality, a potential remains on line 73. To prevent such potential from being detected as voltage signal Vout, microprocessor 71 monitors (or detects) via A/D port 72 a value of a divided voltage between resistors R1 and R2 at node N1. Microprocessor 71 thus operates to indirectly monitor voltage signal Vout in potential.

Thus voltage signal Vout output from power supply 6 for HDMI is monitored in level via A/D port 72 not by detecting a voltage on line 73 (i.e., a voltage indicated by voltage signal Vout) but by detecting a potential appearing at node N1 as the voltage on line 73 (i.e., a voltage indicated by voltage signal Vout) is divided by resistors R1 and R2. Each circuit element has a constant determined such that normally, i.e., when 5 V is derived in voltage signal Vout, a potential of at least 2 V is detected at node N1.

Herein, to allow monitoring the lowest potential (3.3 V) of the plurality of types of power supply voltages 6, 60, 61 and 62 monitored commonly via A/D port 72, node N1's divided voltage is predetermined to have at most the lowest potential based on at most the lowest potential. Note that power supply 6 for HDMI has a potential higher than the lowest potential.

Note that while herein resistor R1 is 10 KΩ and resistor R2 is 20 KΩ, they are not limited to such values.

Figure 4:
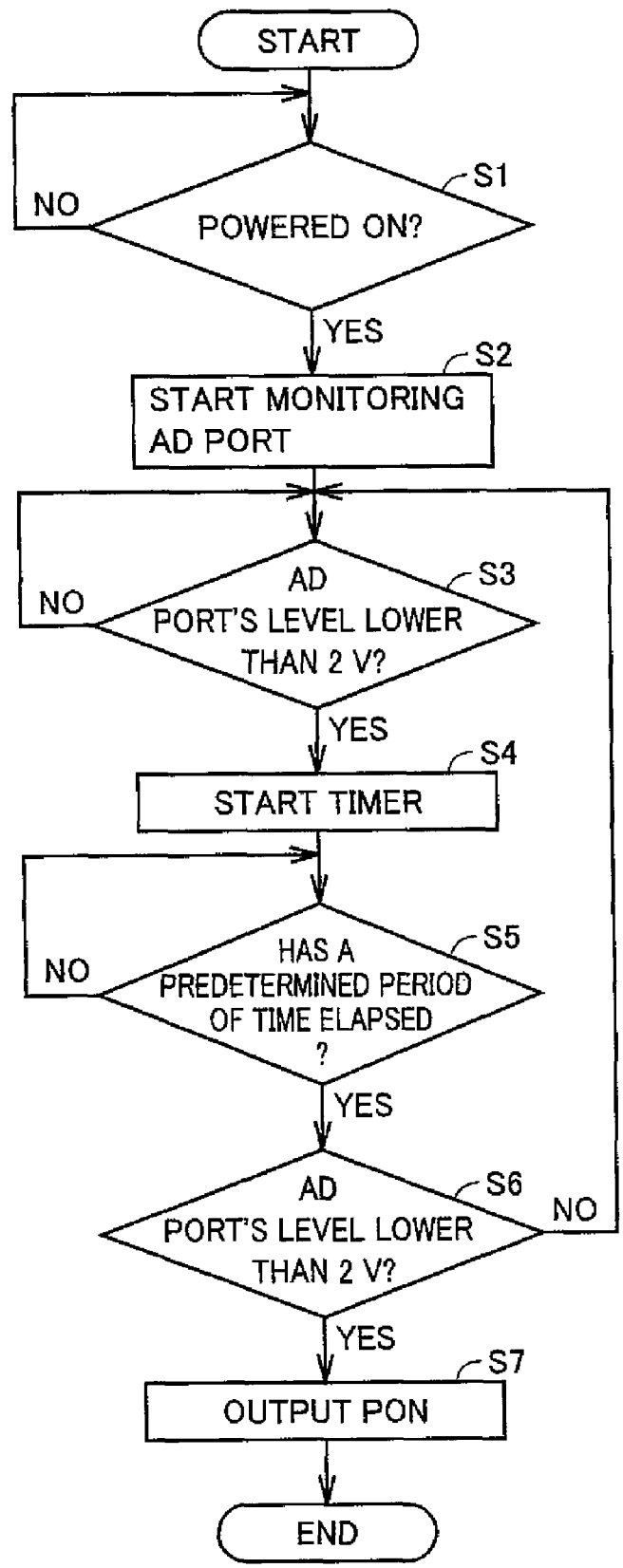
FIG. 4 is a flowchart of a process for overcurrent protection in accordance with an embodiment.

FIG. 4 is a flowchart of a process illustrating an operation for overcurrent protection in accordance with the present embodiment. This flowchart is previously stored as a program in microprocessor 71 at a predetermined storage area, and read by a central processing unit (CPU) (not shown) of microprocessor 71 from the predetermined area and executed to implement its function. Herein it is assumed that sink equipment 1 and source equipment 2 are connected through cable 4.

With reference to FIG. 4, initially when the process starts, microprocessor 71 is in a stand by state. Initially, microprocessor 71 detects whether source equipment 2 is powered on (step S1). If not, microprocessor 71 does not receive a signal SON. In that case (NO at step S1), microprocessor 71 repeats the step S1 determination operation until signal SON is received. If microprocessor 71 receives signal SON it detects that source equipment 2 is powered on. In that case (YES at step S1), microprocessor 71 starts an operation detecting a potential receiving through A/D port 72, i.e., an operation monitoring a potential on node N1 via A/D port 72 (step S2). More specifically, microprocessor 71 monitors whether a voltage received through A/D port 72 has a level lower than a predetermined level in voltage.

Herein the predetermined level in voltage is stored in microprocessor 71 at a memory (not shown), and indicates a predetermined 2 V, as aforementioned.

Then at step S3 microprocessor 71 detects whether the voltage received through A/D port 72 has a level lower than 2 V. If it is at least 2 V (NO at step S3), microprocessor 71 repeats the step S3 determination (or monitoring) step. If it is lower than 2 V (YES at step S3), microprocessor 71 starts an internal timer (not shown) (step S4).

Step S4 is followed by step S5, at which microprocessor 71 detects whether a predetermined period of time (for example of 100 msec) has elapsed since the timer started. If not (NO at step S5), step S5 is repeated until the predetermined period of time elapses. If the predetermined period of time has elapsed since the timer started (YES at step S5), the process proceeds to step S6.

At step S6, microprocessor 71 detects whether the voltage received through A/D port 72 has a level lower than 2 V, i.e., whether the level in voltage at node N1 is lower than 2 V. If so (YES at step S6), microprocessor 71 determines that node N1 has a level in voltage lower than 2 V continuously for the predetermined period of time, and microprocessor 71 sets control signal PON "OFF" and thus outputs the signal.

That node N1 has a level in voltage lower than 2 V continuously for the predetermined period of time means that voltage signal Vout is abnormally decreased in potential, i.e., that power supply line 4A has an overcurrent passing therethrough continuously for a predetermined period of time. Accordingly, microprocessor 71 at step S7 outputs control signal PON of the "OFF" level to interrupt the output line to prevent a voltage output from power supply 6 for HDMI from being derived on line 73 via transistor 75. When step S7 ends, the entire process ends, and microprocessor 71 assumes the stand by state.

If the level in voltage at node N1 is at least 2 V, i.e., if power supply line 4A does no have an overcurrent passing therethrough continuously for the predetermined period of time (NO at step S6), the process returns to step S3. Note that the timer internal to microprocessor 71 stops and is reset whenever it has finished measuring the predetermined period of time since it was started.

At step S6 if node N1 does not have a level in voltage of at most 2 V, power supply line 4A does not have an overcurrent passing therethrough. Accordingly step S3 (monitoring the level in voltage at node N1) is again performed.

Thus in the present embodiment if at step S3 microprocessor 71 detects that a level in voltage at node N1 as monitored is at most 2 V, microprocessor 71 does not set control signal PON in level to the "OFF" level (or does not stop power supply voltage supplied from power supply 6 for HDMI immediately. This can prevent supplying a power supply voltage from being erroneously stopped when voltage signal Vout is low for a significantly short period of time for some reason.

For example, immediately after source equipment 2 is powered on, signal Vout can have a decreased level in voltage in spite that sink equipment 1 normally operates. In such a case, the present embodiment allows continuing an operation supplying power supply voltage from power supply 6 for HDMI, and sink equipment 1 and source equipment 2 can perform normal operation.

Figure 5:
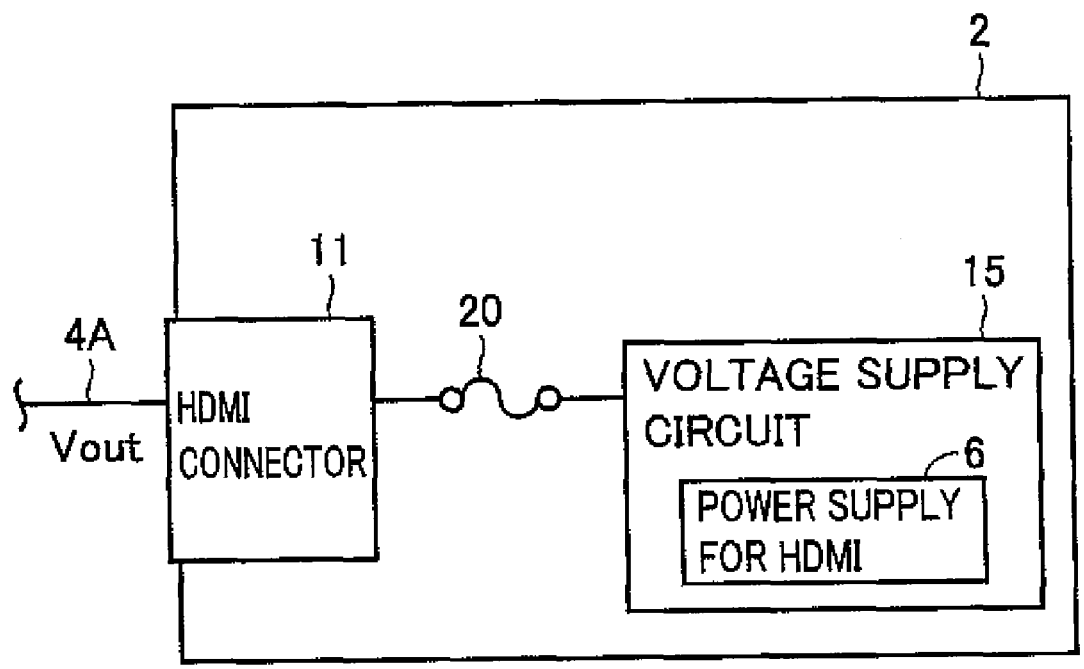
FIG. 5 illustrates a comparative example for overcurrent protection for sink equipment in accordance with an embodiment.

FIG. 5 illustrates comparing an overcurrent protection function employing control device 7 of the present embodiment with that employing a fuse 20. With reference to FIG. 5, source equipment 2 comprises a voltage supply circuit 15 including power supply 6 for HDMI and connected via fuse 20 to HDMI connector 11. HDMI connector 11 and power supply line 4A are identical in configuration to those shown in FIGS. 3 and 1. When power supply line 4A passes an excessively large current, i.e., voltage supply circuit 15 outputs an excessively large current, as based on a voltage output from power supply 6 for HDMI, to sink equipment 1, fuse 20 melts and is thus blown. Voltage supply circuit 15 can thus be used to implement overcurrent protection in a simple configuration.

However, once fuse 20 has melted and thus been blown, source equipment 2 cannot restored to its original condition without exchanging the blown fuse. This is inconvenient to users.

In the present embodiment, in contrast, if there is a problem in a load (IC 5) internal to sink equipment 1, or if a resistive component adhering to HDMI connector 11 causes short circuit, power supply voltage supplied to sink equipment 1 is stopped (or interrupted). Furthermore, in the present embodiment, replacing sink equipment 1 connected to source equipment 2 with a normal product or removing dust adhering to connector 11 or a similar unexpected resistive component allows power supply voltage to be supplied to the load in sink equipment 1 without the necessity of repairing the source equipment 2 power supply 6 for HDMI or similar peripheral circuitry. Thus in the present embodiment an overcurrent protection function as defined in the HDMI specification at item 4.2.7 can be implemented. Furthermore in the present embodiment users' convenience can also be achieved.

In accordance with the present embodiment microprocessor 71 has a function controlling power supply voltage supplied to sink equipment 1. A configuration relating to this function in summary includes: a port (A/D port 72) receiving commonly power supply potentials output from a plurality of types of power supplies (power supply 6 for HDMI, power supply 60 for an LSI, power supply 61 for an audio driver IC, and power supply 62 for a tuner); a voltage dividing resistor (resistors R1, R2) inputting to the port a potential of a voltage on an output line of a predetermined type of power supply (power supply 6 for HDMI) of the plurality of types of power supplies, that is divided; a function interrupting the output line of the predetermined type of power supply in response to detecting that the potential of the divided voltage received through the port is lower than a set potential; and a connector (HDMI connector 11) for supplying the voltage of the predetermined type of power supply from the output line externally. In this configuration the set potential is at most the lowest one of the power supply potentials output from the plurality of types of power supplies and the predetermined type of power supply has a potential higher than the lowest potential.

Accordingly, the potential of the predetermined type of power supply is not detected by detecting the potential of the output line of the predetermined type of power supply. Rather, it is detected indirectly by detecting the potential of the voltage divided by the voltage dividing resistors. This allows the output line's potential to be accurately detected if a resistive component that would otherwise prevent accurate detection of the output line's potential is caused for some reason.

Furthermore the potentials of the plurality of types of power supplies can be monitored through only a single port.

Note that the present embodiment provides information equipment implemented as source equipment 2 having an interface function in conformity with the HDMI specification. It should be noted, however, that the present invention is widely applicable to information equipment including a power supply circuit supplying power supply voltage through an output line such as a cable to a load that is included in equipment connected thereto by the output line. Furthermore the equipment connected to the present information equipment is not limited to equipment reproducing video image data, and may be any equipment having a function processing data received from the information equipment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply control apparatus comprising:
a port connected to a single line configured to commonly receive potentials of power supplies output from a plurality of types of power supplies, respectively;
a voltage dividing resistor configured to divide and input to said port through said single line a potential of a voltage on an output line of a predetermined type of power supply of said plurality of types of power supplies;
an interruption unit configured to interrupt said output line of said predetermined type of power supply in response to detecting that the potential of the divided voltage received through said port is lower than a set potential; and a connector configured to externally supply a voltage of said predetermined type of power supply from said output line, wherein:
said set potential is at most a lowest potential of the potentials of the power supplies output from said plurality of types of power supplies; and
said predetermined type of power supply has a potential higher than said lowest potential.

2. The power supply control apparatus according to claim 1, wherein said interruption unit includes:
a switching transistor provided on said output line; and
a microprocessor configured to interrupt said output line via said switching transistor in response to detecting that the potential of the divided voltage received through said port is lower than said set potential.

3. The power supply control apparatus according to claim 2, wherein said interruption unit detects whether the potential of the divided voltage is lower than said set potential for a predetermined period of time after the potential of the divided voltage decreases from said set potential.

4. The power supply control apparatus according to claim 2, wherein:
said interruption unit further includes a plurality of diodes provided between said plurality of types of power supplies and said port;
said plurality of diodes are associated with said plurality of types of power supplies, respectively; and
said plurality of diodes are each connected to have a forward direction in a direction from said port toward an associated one of said power supplies.

5. The power supply control apparatus according to claim 4, wherein said interruption unit detects whether the potential of the divided voltage is lower than said set potential for a predetermined period of time after the potential of the divided voltage decreases from said set potential.

6. The power supply control apparatus according to claim 4, mounted in information equipment connected to data processing equipment including a load, wherein said information equipment is connected to said data processing equipment by a cable externally inserted into and removed from said connector, supplies voltage to said load included in said data processing equipment from said predetermined type of power supply through said connector and said cable, and outputs data to be processed to said data processing equipment through said cable.

7. The power supply control apparatus according to claim 6, wherein said interruption unit detects whether the potential of the divided voltage is lower than said set potential for a predetermined period of time after the potential of the divided voltage decreases from said set potential.

8. The power supply control apparatus according to claim 6, wherein:
said cable is in conformity with a High Definition Multimedia Interface (HDMI) specification;
said data to be processed is video image data; and
said data processing equipment reproduces said video image data.

9. The power supply control apparatus according to claim 8, wherein said interruption unit detects whether the potential of the divided voltage is lower than said set potential for a predetermined period of time after the potential of the divided voltage decreases from said set potential.

10. The power supply control apparatus according to claim 1, wherein:
said interruption unit further includes a plurality of diodes provided between said plurality of types of power supplies and said port;
said plurality of diodes are associated with said plurality of types of power supplies, respectively; and
said plurality of diodes are each connected to have a forward direction in a direction from said port toward an associated one of said power supplies.

11. The power supply control apparatus according to claim 10, wherein said interruption unit detects whether the potential of the divided voltage is lower than said set potential for a predetermined period of time after the potential of the divided voltage decreases from said set potential.

12. The power supply control apparatus according to claim 10, mounted in information equipment connected to data processing equipment including a load, wherein said information equipment is connected to said data processing equipment by a cable externally inserted into and removed from said connector, supplies voltage to said load included in said data processing equipment from said predetermined type of power supply through said connector and said cable, and outputs data to be processed to said data processing equipment through said cable.

13. The power supply control apparatus according to claim 12, wherein said interruption unit detects whether the potential of the divided voltage is lower than said set potential for a predetermined period of time after the potential of the divided voltage decreases from said set potential.

14. The power supply control apparatus according to claim 12, wherein:
said cable is in conformity with a High Definition Multimedia Interface (HDMI) specification, said data to be processed is video image data; and
said data processing equipment reproduces said video image data.

15. The power supply control apparatus according to claim 14, wherein said interruption unit detects whether the potential of the divided voltage is lower than said set potential for a predetermined period of time after the potential of the divided voltage decreases from said set potential.

16. The power supply control apparatus according to claim 1, mounted in information equipment connected to data processing equipment including a load, wherein said information equipment is connected to said data processing equipment by a cable externally inserted into and removed from said connector, supplies voltage to said load included in said data processing equipment from said predetermined type of power supply through said connector and said cable, and outputs data to be processed to said data processing equipment through said cable.

17. The power supply control apparatus according to claim 16, wherein said interruption unit detects whether the potential of the divided voltage is lower than said set potential for a predetermined period of time after the potential of the divided voltage decreases from said set potential.

18. The power supply control apparatus according to claim 16, wherein:
said cable is in conformity with a High Definition Multimedia Interface (HDMI) specification;
said data to be processed is video image data; and
said data processing equipment reproduces said video image data.

19. The power supply control apparatus according to claim 18, wherein said interruption unit detects whether the potential of the divided voltage is lower than said set potential for a predetermined period of time after the potential of the divided voltage decreases from said set potential.

20. The power supply control apparatus according to claim 1, wherein said interruption unit detects whether the potential of the divided voltage is lower than said set potential for a predetermined period of time after the potential of the divided voltage decreases from said set potential.

* * * * *